United States Patent [19]

Osborne

[11] 4,271,957
[45] Jun. 9, 1981

[54] MECHANICAL TRANSFER BAR DRIVE ASSEMBLY

[75] Inventor: Robert L. Osborne, Mount Clemens, Mich.

[73] Assignee: LaSalle Machine Tool, Inc., Troy, Mich.

[21] Appl. No.: 74,902

[22] Filed: Sep. 12, 1979

[51] Int. Cl.³ .............................................. B65G 25/12
[52] U.S. Cl. ...................................... 198/737; 74/44; 74/45; 198/742
[58] Field of Search ............... 198/621, 737, 742, 575, 198/576; 74/40, 44, 45

[56] References Cited

U.S. PATENT DOCUMENTS

| 3,062,353 | 11/1962 | Opperthauser | 198/737 |
| 3,246,461 | 4/1966 | Wood | 74/45 X |
| 3,798,981 | 3/1974 | Richards et al. | 74/40 |
| 3,983,758 | 10/1976 | Hovekamp | 74/45 |

Primary Examiner—Jeffrey V. Nase

[57] ABSTRACT

A drive mechanism for advancing workpieces through a plurality of spaced-apart work stations which are arranged so that the distances between certain adjacent work stations are greater than the distances between other adjacent work stations. During an advancing stroke, the drive mechanism moves each workpiece from one work station the entire distance to the next work station so that no workpiece occupies any space between adjacent work stations after the completion of the advancing stroke. The drive mechanism includes a rotary drive crank to which a plurality of drive links are pivotally mounted. Each drive link is connected to a transfer bar which is guidably supported for straight line reciprocal movement to engage and advance the workpieces. A predetermined half-cycle movement of the drive crank imparts contemporaneous movement to the transfer bars which are moved through different distances during the half cycle movement of the drive crank to advance all workpieces to the next work stations.

3 Claims, 12 Drawing Figures

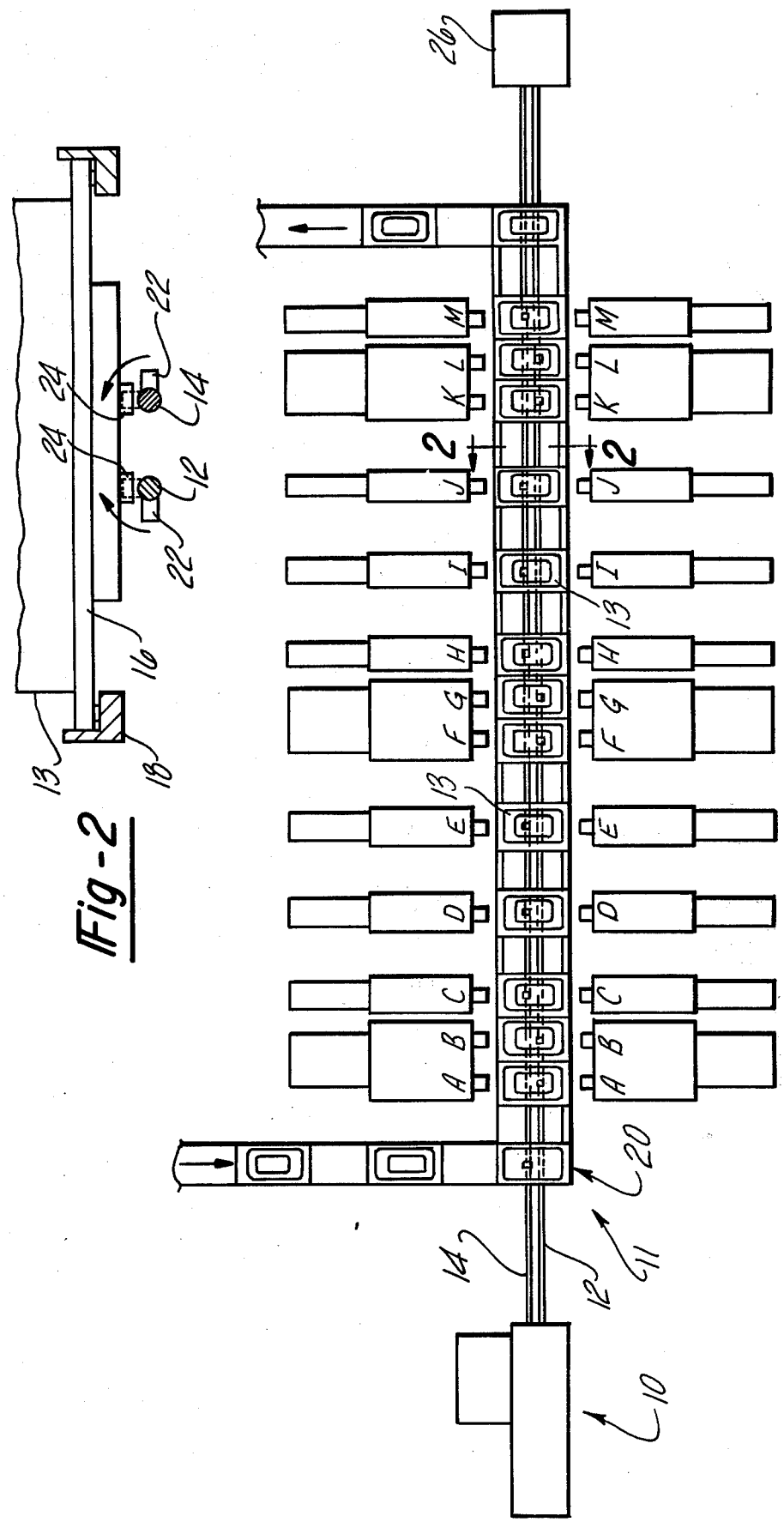

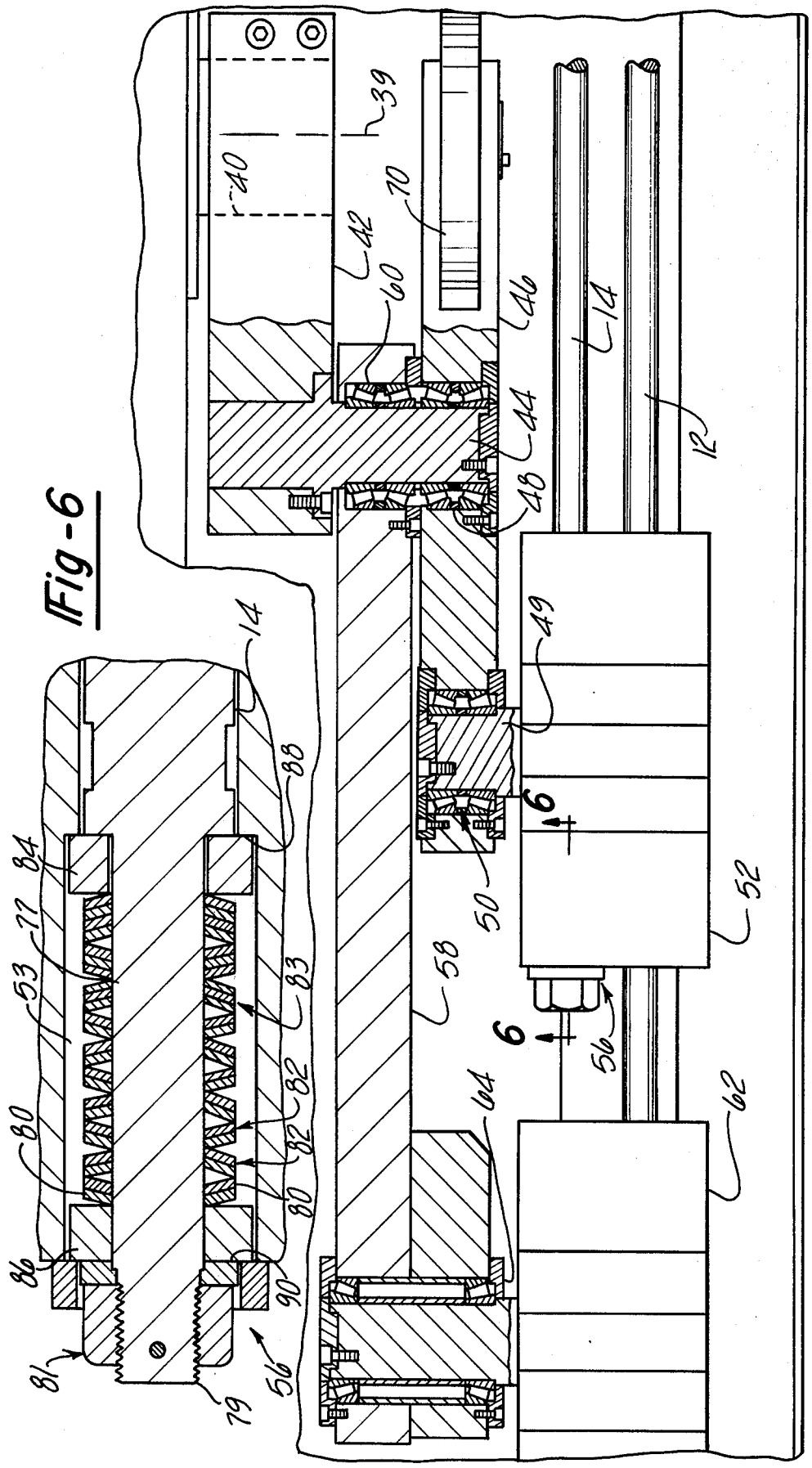

MECHANICAL TRANSFER BAR DRIVE ASSEMBLY

BACKGROUND OF THE INVENTION

The present invention relates generally to transfer mechanisms for advancing workpieces through a plurality of work stations in an automated machining line and relates to U.S. Pat. No. 3,798,981, assigned to the assignee of the present application. U.S. Pat. No. 3,798,981 discloses a drive mechanism which imparts cyclical reciprocal movement to a single transfer bar. When the transfer bar engages and advances a plurality of workpieces, all workpieces are moved through the same distance corresponding to the length of the stroke of the transfer bar. Consequently, all adjacent work stations must be spaced apart equally a distance equivalent to the length of the stroke of the transfer bar, in order to advance each workpiece the entire distance from one work station to the next work station.

Sometimes it is necessary to set up the machining line with some adjacent work stations spaced apart distances greater than the length of the stroke of the transfer bar. As a result more than a single stroke is required to advance the workpieces between those work stations resulting in the use of idle stations at which these workpieces are temporarily stored. Some workpieces, therefore, are not machined while other workpieces at their respective stations are machined. The workpieces are carried on pallets or advanced in a free transfer system in which no pallets or other workpiece supports are used.

When pallets are used, additional ones are needed to ensure that all work stations are occupied for a machining operation after each advancing stroke. Pallets and idle stations are costly in known transfer systems.

It is the general object of this invention, therefore, to provide a drive mechanism in a transfer apparatus operable to contemporaneously move a plurality of workpieces through unequally spaced work stations leaving no workpiece stranded between work stations.

SUMMARY OF THE INVENTION

In accordance with the present invention, a drive mechanism is provided and includes the components of the drive mechanism disclosed in U.S. Pat. No. 3,798,981. These components include a drive shaft, a drive crank secured to the drive shaft, a first drive link pivotally mounted intermediate its ends on the drive crank, and a carriage guidably supported for horizontal movement and releasably attached to a transfer bar and pivotally connected at one end to the first drive link. Coacting cam and cam follower means on the main frame for the drive mechanism and on the other end of the drive link assure continuous movement of the transfer bar in one direction in response to a one-half cycle movement of the drive crank and continuous movement of the transfer bar in an opposite direction in response to the other half cycle movement of the drive crank.

A second drive link is pivotally mounted at one end thereof to the drive crank and is pivotally attached to a second carriage which is also guidably supported for horizontal movement and releasably attached to a second transfer bar. The first one-half cycle movement of the drive crank contemporaneously moves the transfer bars in one direction with one of the transfer bars being moved through a greater distance than the other transfer bar. Thus, in a series of work stations in which certain adjacent work stations are spaced apart a distance that is greater than the distance between other adjacent work stations the drive mechanism of the present invention provides for the advancement of each workpiece from its occupied work station the entire distance to the next work station in response to the advancing half-cycle movement of the drive crank. As a result, no workpieces are left stranded between work stations in which the spacing is greater than the spacing between other adjacent work stations.

A force dissipating assembly connects each transfer bar with its associated carriage to dissipate acceleration and deceleration forces generated as a result of the reciprocal movement of the carriage. The force dissipating assembly includes a plurality of resilient disk members arranged face-to-face to form a spring unit. In response to movements of the transfer bar, the spring unit is compressed to cushion the force applied to the workpieces.

Further objects, features and advantages of this invention will become apparent from a consideration of the following description, the appended claims, and the accompanying drawing in which:

FIG. 1 is a plan view of a machining line showing a plurality of work stations, a conveyor supporting a plurality of workpieces and the transfer apparatus of the present invention for moving the workpieces through the work stations;

FIG. 2 is a sectional view of the conveyor taken from line 2—2 in FIG. 1 showing the drive mechanism of the transfer apparatus of this invention disengaged from a workpiece;

FIG. 5 is a top view of the transfer assembly shown in FIG. 4 with some parts shown in section for the purpose of clarity;

FIG. 6 is an enlarged fragmentary view showing a force dissipating assembly attaching a transfer bar of the transfer assembly to an associated carriage member and is taken generally from line 6—6 in FIG. 5;

Figure 10:
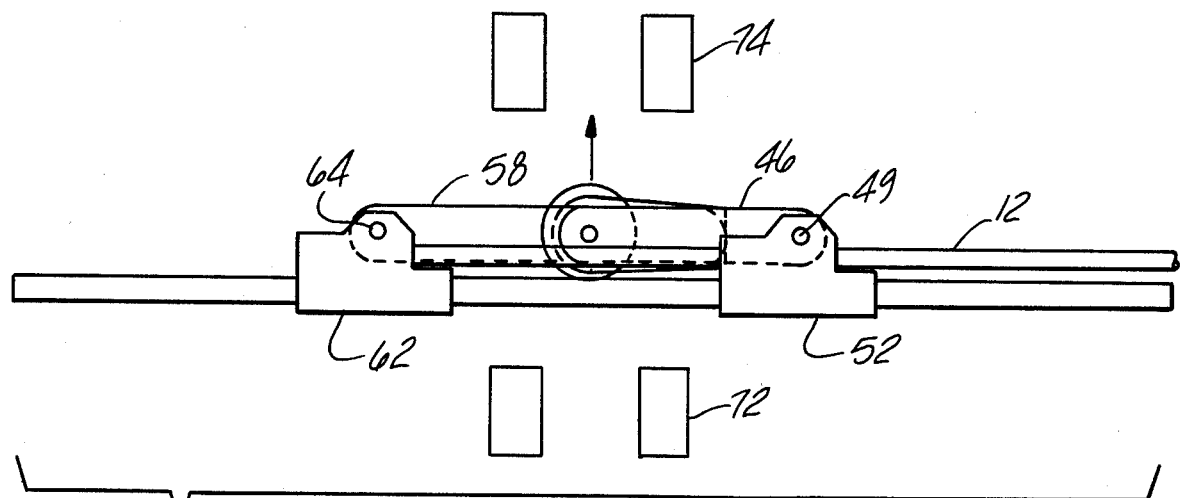
Figure 11:
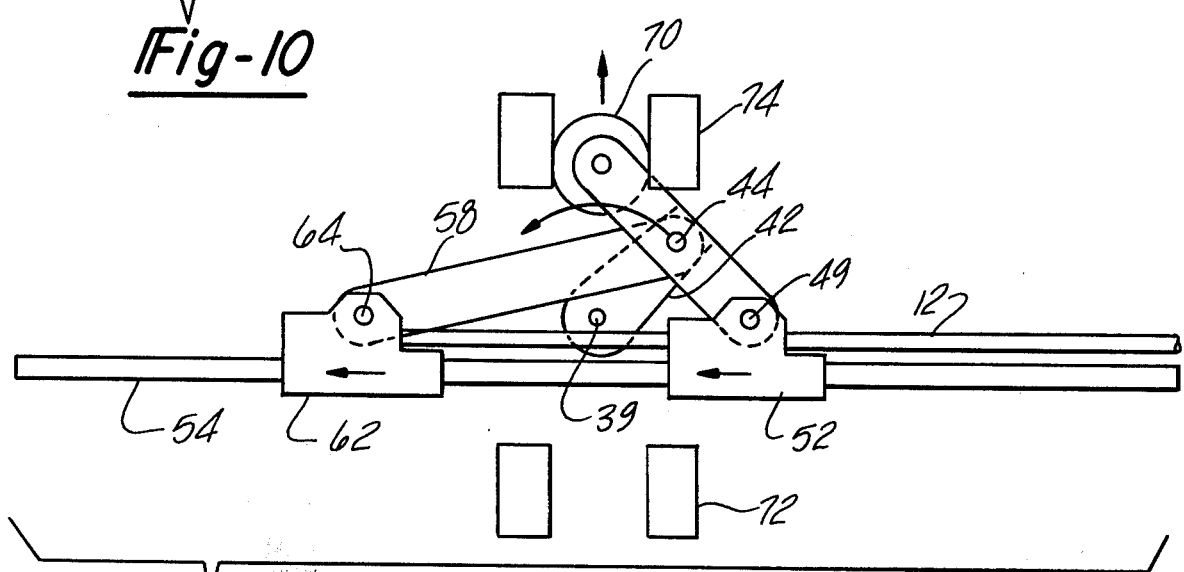
Figure 12:
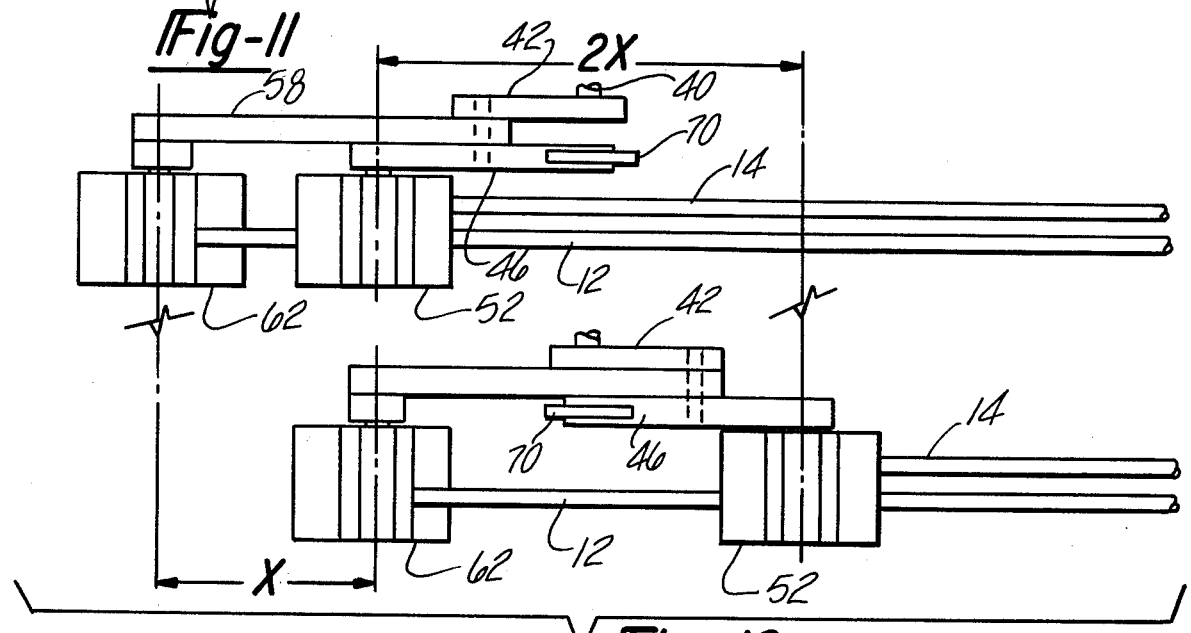

FIGS. 7-11, inclusive, are diagrammatic view of the drive mechanism of this invention showing the mechanism in progressively moved positions; and FIG. 12 is a plan view of the transfer apparatus showing its position at the beginning and after a one-half cycle of movement.

Referring to the drawing, the mechanical transfer assembly of this invention, indicated generally at 10, is illustrated in FIG. 1 as being employed in the machine line 11 which consists of a plurality of spaced apart work stations, designated by the reference letters A–M, inclusive. The distances between the adjacent stations A and B, B and C, F and G, G and H, K and L, and L and M are equal. Similarly, the distances between the adjacent stations C and D, D and E, E and F, H and I, I and J, and J and K are equal and are twice as great as the distances between the first series of work stations.

The transfer assembly 10 includes a pair of transfer bars 12 and 14 which are contemporaneously moveable in reciprocal straight line paths. During an advancing stroke of the transfer assembly 10, the transfer bar 12 is operable to engage all workpieces 13 positioned at the work stations A, B, F, G, K and L and advance them to their next work stations and the transfer bar 14 is operable to engage and advance all workpieces 13 positioned at the work stations C, D, E, H, I and J to the next work stations. The transfer assembly 10 thus operates to advance the workpieces 13 between work stations arranged so that the distances between some of the adjacent work stations are twice as great as the distances between the remaining adjacent work stations. As a result, no workpieces 13 are stranded between any work stations after the completion of an advancing stroke of the transfer assembly 10.

The workpieces 13 are generally supported on pallets 16 which in turn are advanced along a conveyor 18. The pallets 16 are moved by suitable means to a launch station 20 where the transfer bar 14 is operable to engage the pallet 16 at the station 20 and move it during an advancing stroke to the work station A. It is to be understood that the launch station 20 could be situated relative to the work station A such that the shorter stroke transfer bar 12 could be employed to advance the pallet 16 from the launch station 20 to the initial work station A. Similarly, the workpieces 13 are moved from the work station M by either transfer bars 12 or 14 depending upon the particular design of the system.

The transfer bars 12 and 14 are each equipped with dogs 22 (FIG. 2) which are engageable with strut members 24 positioned on the underside of and extending transversely of the pallets 16. Transfer bar rotating means 26 operates to rotate the transfer bars 12 and 14 between operative positions (shown in broken lines in FIG. 2) in which the dogs 22 are in interferring relationship with the strut members 24 and inoperative positions in which the dogs 22 are in clearance relationship with the strut members 24. After the transfer bars 12 and 14 are rotated to operative positions, an advancing stroke of the bars 12 and 14 will cause their associated dogs 22 to engage the struts 24 to advance the pallets 16 to the next work stations. After completion of the advancing stroke, the transfer bar rotating apparatus 26 rotates the transfer bars 12 and 14 to inoperative positions so that the dogs 22 are in clearance relationship with the struts 24 enabling the transfer drive assembly 10 to retract the transfer bars 12 and 14 without affecting the position of the pallets 16 at their respective work stations. The transfer bar 14 is equipped with dogs 22 at work stations C, D, E, H, I and J while the transfer bar 12 is equipped with dogs 22 at the work stations A, B, F, G, K, and L. In this embodiment, a dog 22 is mounted on the transfer bar 14 at the launch station 20 for moving a pallet 16 to the work station A and another dog 22 is mounted on the transfer bar 14 at the work station M to move the pallets 16 away from the station M and along the conveyor 18.

Assume that all work stations A-M are occupied by workpieces and that a workpiece is positioned in the launch station 20. Assume further that the transfer bars 12 and 14 are in their retracted positions. The transfer bar rotating apparatus 26 rotates the transfer bars 12 and 14 placing the dogs 22 in their operative positions. The transfer assembly 10 then would contemporaneously advance the transfer bars 12 and 14 from left to right as viewed in FIG. 1 moving all pallets 16 to the next work stations except for the pallet 16 at the work station M which is just moved down the conveyor 18. After the completion of the advancing stroke, the transfer bar rotating apparatus 26 rotates the transfer bars 12 and 14 to their inoperative positions so that upon the return stroke of the transfer bars 12 and 14 by the transfer assembly 10, the positions of the pallets 16 would not be affected.

Figure 3:
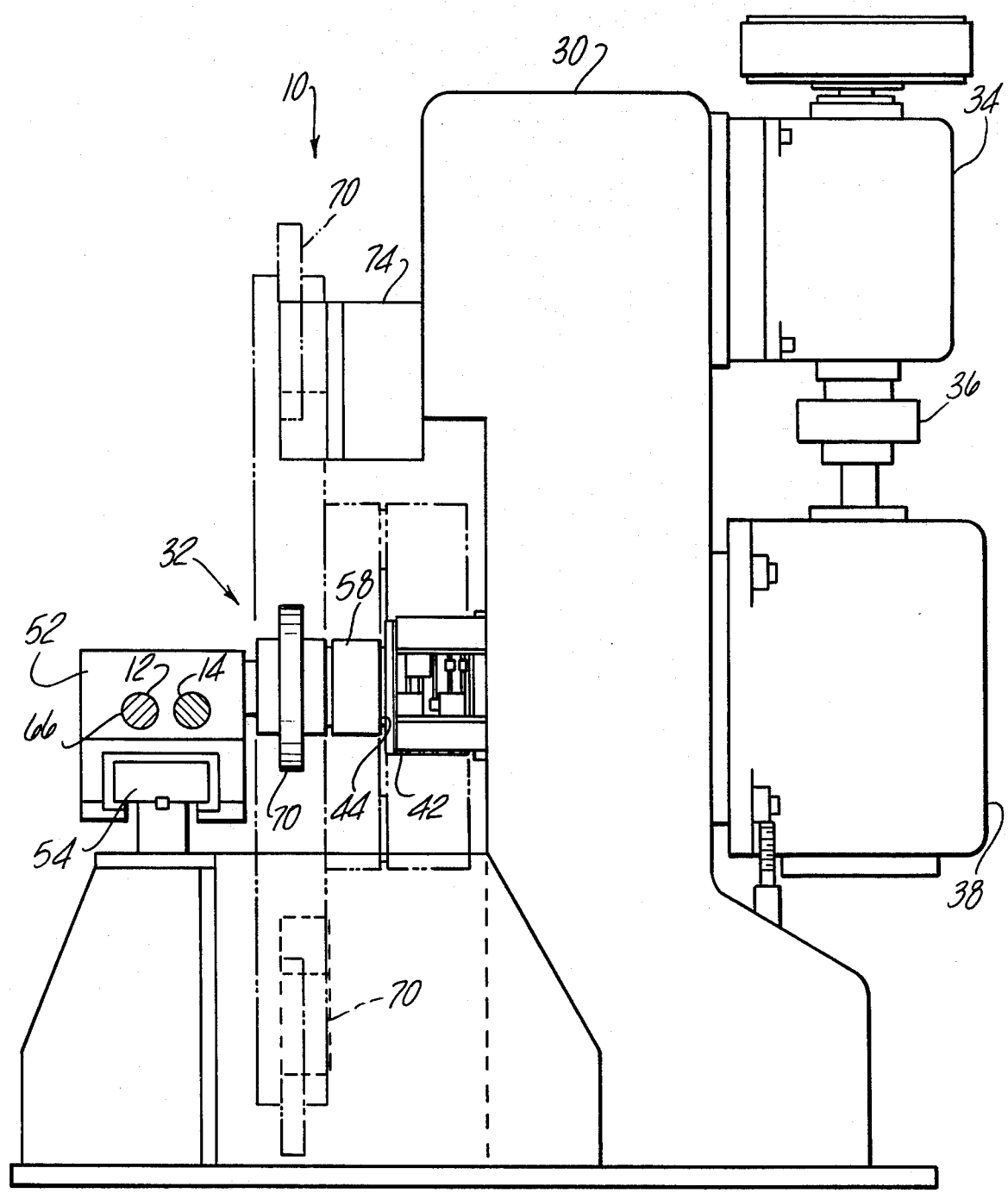
FIG. 3 is a side elevation view of the transfer apparatus of this invention, with some parts broken away and other parts shown in section for the purpose of clarity.

Referring to FIGS. 3 & 5, the mechanical transfer assembly 10 includes a main frame 30 on which the transfer bars 12 and 14 are mounted for back and forth horizontal movement in response to operation of a drive mechanism 32. A motor 34, mounted on the main frame 30, drives a clutch and brake assembly 36 which is in turn connected to a gear mechanism indicated at 38 which in turn rotatably drives a drive shaft 40.

The drive mechanism 32, is generally disclosed in U.S. Pat. No. 3,798,981 which is incorporated herein by reference and further description of the drive mechanism 32 will be made to the extent necessary for understanding of the present invention.

The drive mechanism 32 includes a drive crank 42 secured at one of its ends to the drive shaft 40 and at the opposite end carries a pivot pin 44. A first drive link member 46 is pivotally mounted intermediate its ends on the pivot 44 by a bearing assembly 48 and is pivotally connected by a pin member 49 and bearing assembly 50 at one end to a carriage 52. The carriage 52 is in turn guidably supported on a horizontal guide rail 54 carried by the frame 30. The transfer bar 14 is releasably connected to the carriage 52 by a force dissipating mechanism 56 (FIG. 6) which functions to dissipate forces resulting from acceleration, deceleration and the cyclical movement of the drive crank 42. Further detailed description of the force dissipating assembly 56 will be given below.

A second link member 58 is pivotally connected at one end inside of the drive link 46 to the pivot pin member 44 by a bearing assembly 60 (FIG. 5) and is pivotally connected to a second carriage member 62 at its other end by a pin and bearing assembly 64. The carriage 62 is also guidable supported on the horizontal guide rail 54 and is releasably connected to the transfer bar 12 by a force dissipating mechanism 56. The carriage 52 has a longitudinal passageway 66 (FIG. 3) through which the transfer bar 12 extends enabling the movement of the carriage member 52 relative to the transfer bar 12. As seen in FIG. 3, the transfer bars 12 and 14 are positioned in general horizontal side by side alignment so as to be moveable contemporaneously in response to a driving rotation of the drive crank 42.

As shown in FIGS. 3, 4 and 7-11, inclusive, the end of the first drive link 46 remote from the carriage 52 has a roller 70 supported thereon. The roller 70 is intended for cooperation with cam members 72 and 74 disposed below and above the guide 54. The cam members 72 and 74 form track sections 72a and 74a which function to confine the roller 70 and thus discipline the movement of the drive link 46. By virtue of this discipline, the transfer bar 14 will be moved continuously in one horizontal direction for each half-cycle movement of the drive crank 46. The top most and bottom positions of the roller 70 are shown in broken line in FIG. 3.

The force dissipating assembly 56 is employed to secure the transfer bars 12 and 14 to their respective carriage members 52 and 62. Since both carriage members 52 and 62 are identical, the force dissipating mechanism 56 will be described in connection with the carriage member 52 and the transfer bar 14. An opening 53 is formed through the carriage member 52 to receive the transfer bar 14 which is moveable in the opening 53 relative to the carriage member 52. The transfer bar 14 has a reduced diameter portion 77 which is threaded at its end 79 on which a nut and washer assembly 81 is secured.

A plurality of resilient disk members 80 are arranged in groups 82 on the portion 77 of the transfer bar 14 to coact as a spring unit 83 for absorbing impact forces. The groups 82 are moveably mounted on the transfer bar 12 and 14 and are retained between retaining members 84 and 86 which are slideably mounted on the portion 77 of the transfer bar 14 and whose diameter are greater than the diameter of the transfer bar 14. Movement of the retaining member 84 to the right, as seen in FIG. 6, is prevented by the shoulder 88 formed on the carriage member 52 and movement of the spring retaining member 86 to the left, as viewed in FIG. 6, is prevented by the shoulder 90 on the carriage member 52.

Each disk member 80 is circular in shape and is formed of relatively thin flexible material such as metal. A central opening is formed in each disk 80 from which the disk extends at an angle to form a generally conical configuration. The disks 80 are slideably mounted on the reduced portion in the groups 82. All disk members 80 in a group 82 are positioned to face in the same direction so as to nest together. Alternating groups 82 of disk members are mounted on the reduced portion 77 to face in the same direction with adjacent groups 82 facing in opposite directions. The peripheral edges of the outside disk member 80 in one group 82 abuts the peripheral edges of an outside disk member 80 in an adjacent group 82 at one end of the one group 82. Also, the central portions of the outside disk member 80 on the opposite end of the one group 82 abuts the central portions of the outside disk member 80 in the group 82 on the opposite end of the one group 82. The number of groups 82 and the number of disk members 80 in each group can be selected to provide the the desired shock absorbing characteristics for the assembly 56.

When the carriage member 52 is accelerated to the right, as viewed in FIG. 6, the shoulder 90 bears against the retaining member 86 which in turn presses against the spring unit 83 which is compressed against the retaining member 84 since movement of the retaining member 84 to the right is prevented by the shoulder 88. Similarly, movement of the carriage 52 to the left causes the retaining member 84 to compress the spring unit 83 against the retaining member 86 which abuts the shoulder 90. The force dissipating assembly 56 thus assures the smooth movement of the transfer bar 14 in reciprocal directions.

Figure 4:
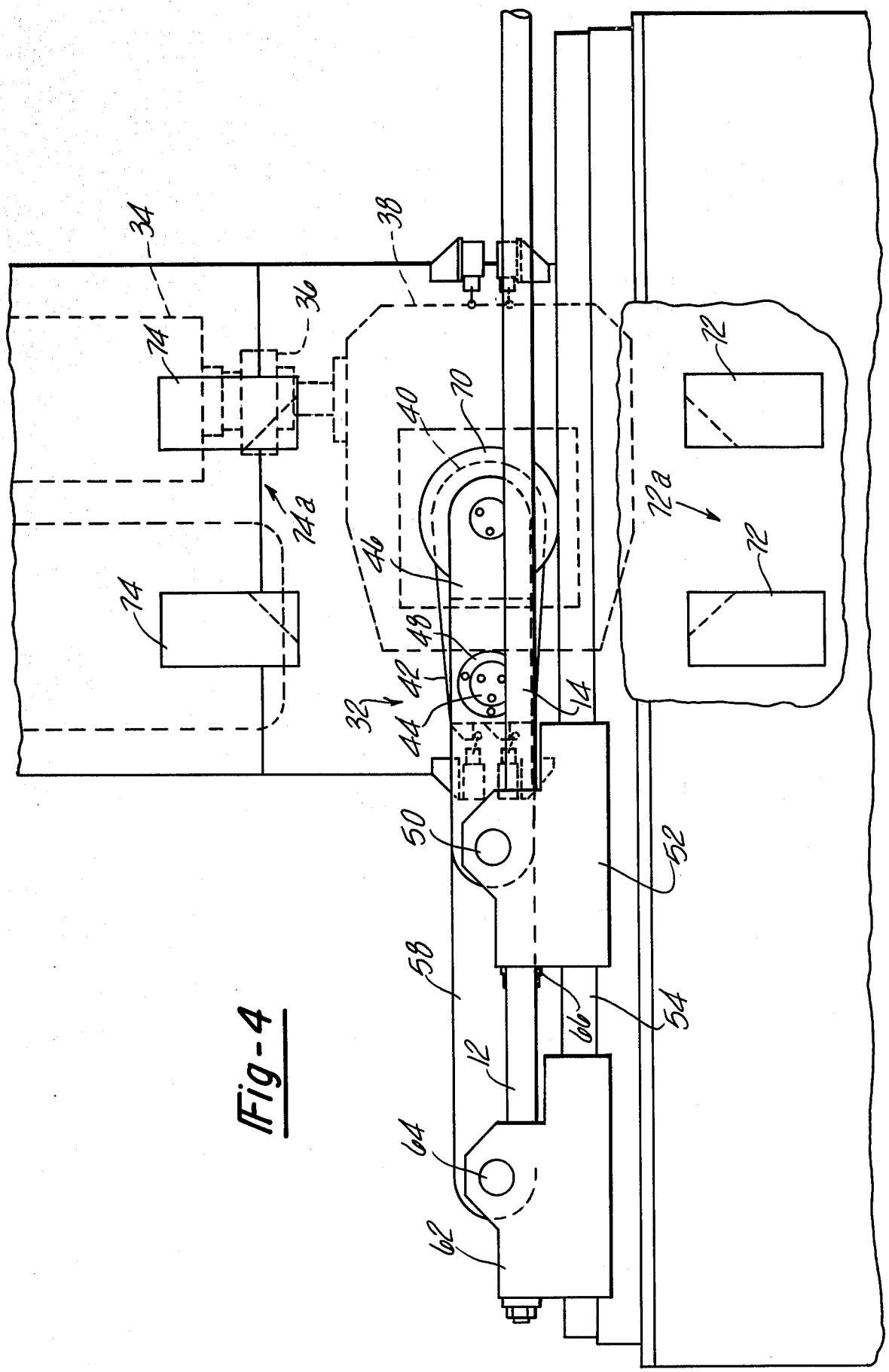
FIG. 4 is a front elevation view of the drive mechanism of this invention shown in assembly relation with a mechanical transfer assembly.
Figure 7:
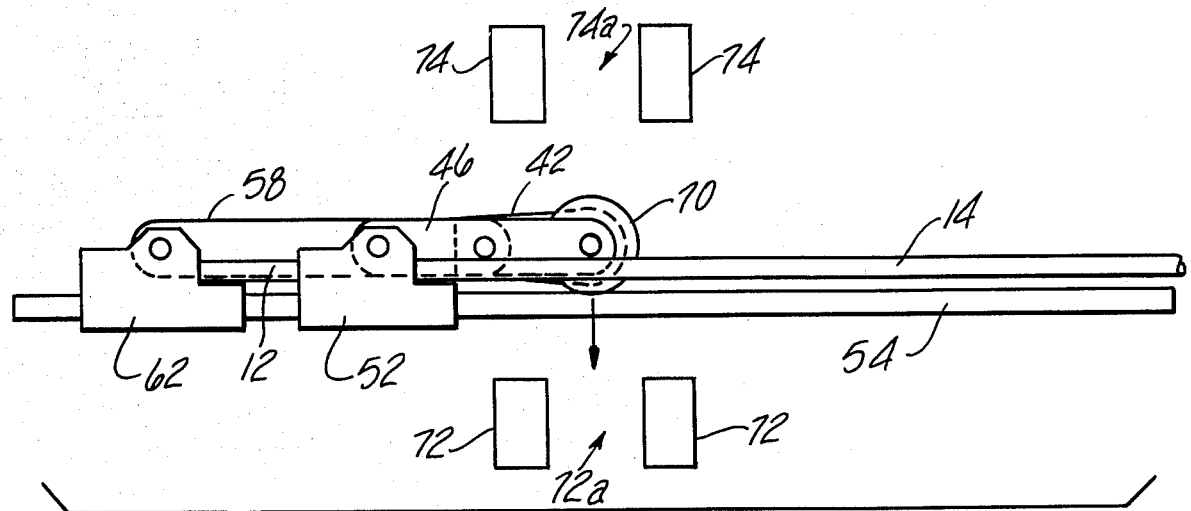
Figure 8:
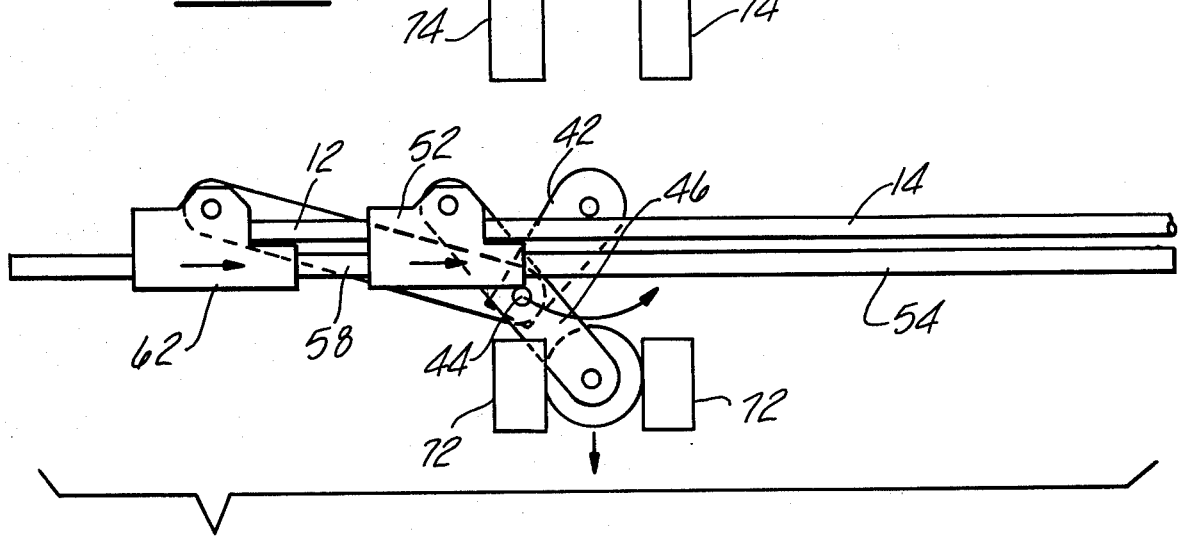

In operation, assume that the drive crank 42 and the first and second drive link members 46 and 58 are in their retracted positions shown in FIGS. 4 and 7. Assume further that a first predetermined half-cycle movement of the drive crank 42 will be a hundred and eighty degree counter-clockwise revolution beginning from its horizontal position shown in FIG. 7 and terminating at its horizontal position shown in FIG. 10. During this counter-clockwise movement, the transfer bars 12 and 14 are moved to the right in an advancing stroke to engage and move the workpieces from their occupied work stations to the next work stations. As the crank 42 is rotated counter-clockwise from its FIG. 7 position to its FIG. 8 position, the first drive link member 46 is pivoted about the pin 44 to lower the roller 70 between the track portion 72a. In the meantime, the carriage 52 is being moved to the right being guidably supported on the rail 54. Coincidentally, the carriage 62 is moved to the right on the guide rail 54 as the link member 58 is moved to the right by the drive crank 42.

Figure 9:
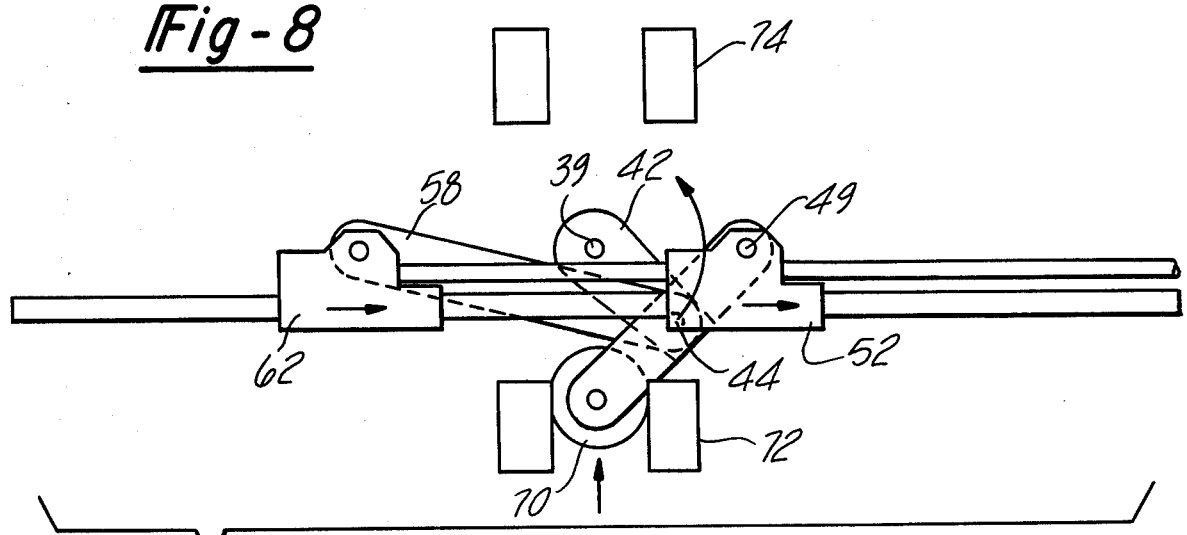

As shown in FIGS. 9 and 10, the first drive link member 46, by virtue of the confinement of the wheel 70 between the cam members 72 enable the carriage member 52 to be moved to the right of the pivot point 39 of the drive crank 42.

The distance through which the carriage member 62 is moved is determined by the distance between the pivot 39 and the pin 44 on the drive crank 42 so long as the distance between the pivot 44 and the pivot 64 on the link 58 is greater than the distance between the pivot 44 and the pivot 49 on the drive link 46. The total distance moved by the carriage 62 is equal to twice this distance as the crank 42 is rotated 180 degrees. The distance between the pin 44 and the pin 49 which connects the first drive link member 46 to the carriage member 52 is equal the distance between the pin 44 and the pivot 39 so that the carriage member 52 is moved through a distance that is twice the sum of these two lengths which is twice the distance through which the carriage 62 is moved. The distance between the pivot 39 and the pin 44 on the crank must equal the distance between the pin 44 and the pin 49 on the drive link 46, otherwise, vertical movement would be imparted to the carriage 52 as the drive crank 42 rotates.

FIG. 12 illustrates the FIG. 7 position of the drive mechanism 32 in the upper portion and the FIG. 10 position in the lower portion. As can be seen, the carriage member 62 is moved a distance "X" through a one-half cycle movement of the crank 42 while the carriage 52 is moved through a distance "2X" during the same one-half cycle of movement. Thus, the carriage member 52 must attain a higher velocity to be moved a distance twice as great as the distance the carriage member 62 is moved during the same time period.

FIG. 11 illustrates the return half cycle movement of the drive crank 42 which elevates the roller 70 between the upper cam members 74 to assure continuous movement of the transfer bars 12 and 14 to the left when the first drive link member 46 is parallel with the crank 42. During each half-cycle movement of the drive crank 42, the transfer bars 12 and 14 are moved contemporaneously with the transfer bar 14 being moved through a distance that is twice as great a distance through a distance that is twice as great a distance through which the transfer bar is moved during the same time period.

As can be seen in FIG. 1, the work stations A-M are spaced apart so that the distances between adjacent work stations are either equal to the distance of the movement of the transfer bar 12 or equal to the distance of the movement of the transfer bar 14. A one-half cycle of movement of the drive crank 42 will provide for the contemporaneous movement of the transfer bars 12 and 14 through two different lengths of stroke movement. The transfer assembly 10 thus enables greater flexibility in the positioning of the work stations A-M relative to each other while eliminating the possibility that workpieces will be left between work stations after an advancing stroke has been completed.

From the above description, it can be seen that an improved transfer assembly 10 is provided which allows a plurality of transfer bars to be moved contemporaneously through different distances of travel by a single drive mechanism. The mechanism is accurate and capable of tolerating the forces resulting from acceleration and deceleration by virtue of the load dissipating unit 56. Since the transfer assembly 10 eliminates the temporary positioning of the pallets 16 between work stations after an advancing stroke, fewer pallets 16 are needed which provides cost savings to the user as does the elimination of idle work stations.

What is claimed:

1. In a transfer mechanism for moving workpieces in a generally horizontal direction through a plurality of work stations, a main frame, a generally horizontal guide rail fixed on said main frame, first and second carriage members slidably mounted on said guide rail in a horizontally spaced relation, a first transfer bar secured to said first carriage member and mounted on said main frame for generally horizontal straight line movement, a drive mechanism for imparting simple harmonic motion to said first transfer bar, said drive mechanism comprising a drive shaft, drive means for said drive shaft operable to continuously rotate said drive shaft through full cycles of movement, a drive crank having one end secured to said drive shaft so that said drive crank is movable through full cycles of movement, a drive link pivotally mounted intermediate its ends on the other end of said drive crank, means pivotally connecting one end of said drive link to said first carriage member, coacting means on said frame and the opposite end of said drive link assuring continuous movement of said first transfer bar in one direction in response to predetermined half cycle movement of said drive crank, a second transfer bar arranged in a generally parallel side-by-side relation with said first transfer bar, said second transfer bar being secured to said second carriage member and mounted on said main frame for generally horizontal straight line movement parallel to said first transfer bar, and link means pivotally connected at one end to said drive crank and at the opposite end to said second carriage member operable to provide for movement of said second transfer bar concurrently with said continuous movement of said first transfer bar, said link means being arranged so that said transfer bars are moved through different distances in response to said predetermined half cycle of movement of said drive crank.

2. The transfer mechanism according to claim 1, wherein each of said carriage members includes force dissipating means connecting said carriage member to an associated transfer bar operable to dissipate forces between said carriage member and said associated transfer bar resulting from changes in movement of said transfer bars.

3. The transfer mechanism according to claim 2, wherein said transfer bars are located in common horizontal planes, passageway means formed through at least one of said carriage members through which another transfer bar extends enabling relative movement between said one carriage member and said other transfer bar during simultaneous movement of said transfer bars.

* * * * *